United States Patent [19]

Kihara

[11] 4,031,514
[45] June 21, 1977

[54] ADDRESSING SYSTEM IN AN INFORMATION PROCESSOR

[75] Inventor: Toshimasa Kihara, Kunitachi, Japan

[73] Assignee: Hitachi, Ltd., Japan

[22] Filed: Sept. 2, 1975

[21] Appl. No.: 609,605

[30] Foreign Application Priority Data

Sept. 4, 1974 Japan .......................... 49-100924

[52] U.S. Cl. ............................................. 364/200
[51] Int. Cl.² ........................................... G06F 9/20
[58] Field of Search .............................. 340/172.5

[56] References Cited

UNITED STATES PATENTS

| | | | |
|---|---|---|---|
| 3,061,192 | 10/1962 | Terzian | 235/157 |
| 3,530,439 | 9/1970 | Smith | 340/172.5 |
| 3,735,364 | 5/1973 | Hatta et al. | 340/172.5 |
| 3,754,218 | 8/1973 | Hatta et al. | 340/172.5 |
| 3,900,835 | 8/1975 | Bell et al. | 340/172.5 |

*Primary Examiner*—Gareth D. Shaw
*Assistant Examiner*—C. T. Bartz
*Attorney, Agent, or Firm*—Craig & Antonelli

[57] ABSTRACT

An addressing system in an information processor for accessing to data regularly scattered in the whole memory region, comprising an index register, an adder, an address register, an instruction register, and a circuit which detects information of a portion of an operation part of the instruction register. When the detection output of the detecting circuit is specified information, information of an address part of the instruction register and information of the index register are added by the adder. The result is stored into the address register. After designating an address, the added information is shifted to the index register.

4 Claims, 2 Drawing Figures

ADDRESSING SYSTEM IN AN INFORMATION PROCESSOR

DETAILED DESCRIPTION OF THE INVENTION

This invention relates to an addressing system in an information processor.

In an information processor such as a computer, an address system based on the index qualification method or a direct address system has hitherto been known as an addressing system for processing data scattered in the whole memory region.

The former is capable of designating a maximum of several addresses with reference to an address designated in an index register.

For example, in a computer in which one word is composed of 16 bits and an address part in an instruction word is composed of 8 bits, a maximum of only 128 addresses can be designated with reference to the address designated in the index register. Accordingly, where an address outside the amount of displacement is to be designated, it becomes necessary to rewrite the contents of the index register, and the program becomes complicated.

The latter leads to multi-word instructions in order to enable access to the whole memory region, and is very poor in efficiency.

This invention has been made in order to solve the above problem, and has for its object to provide a novel address system which can efficiently process data regularly scattered in the whole memory region.

The fundamental construction of this invention for accomplishing the object is characterized, in an information processor, by comprising at least an index register, an adder, an address register, instruction register, and a circuit which detects an information of a portion of an operation part of said instruction register, so that when said information of the portion of the operation part of said instruction register becomes a certain specific information, it is detected, information of an address part of said instruction register and information of said index register being added by said adder and being stored into said address register, the added information being thereafter written into said index register.

Hereunder an embodiment of this invention will be concretely explained with reference to the drawing.

BRIEF DESCRIPTION OF THE DRAWING

FIG. 1 is a block diagram showing an example of this invention, while

DETAILED DESCRIPTION

Figure 1:
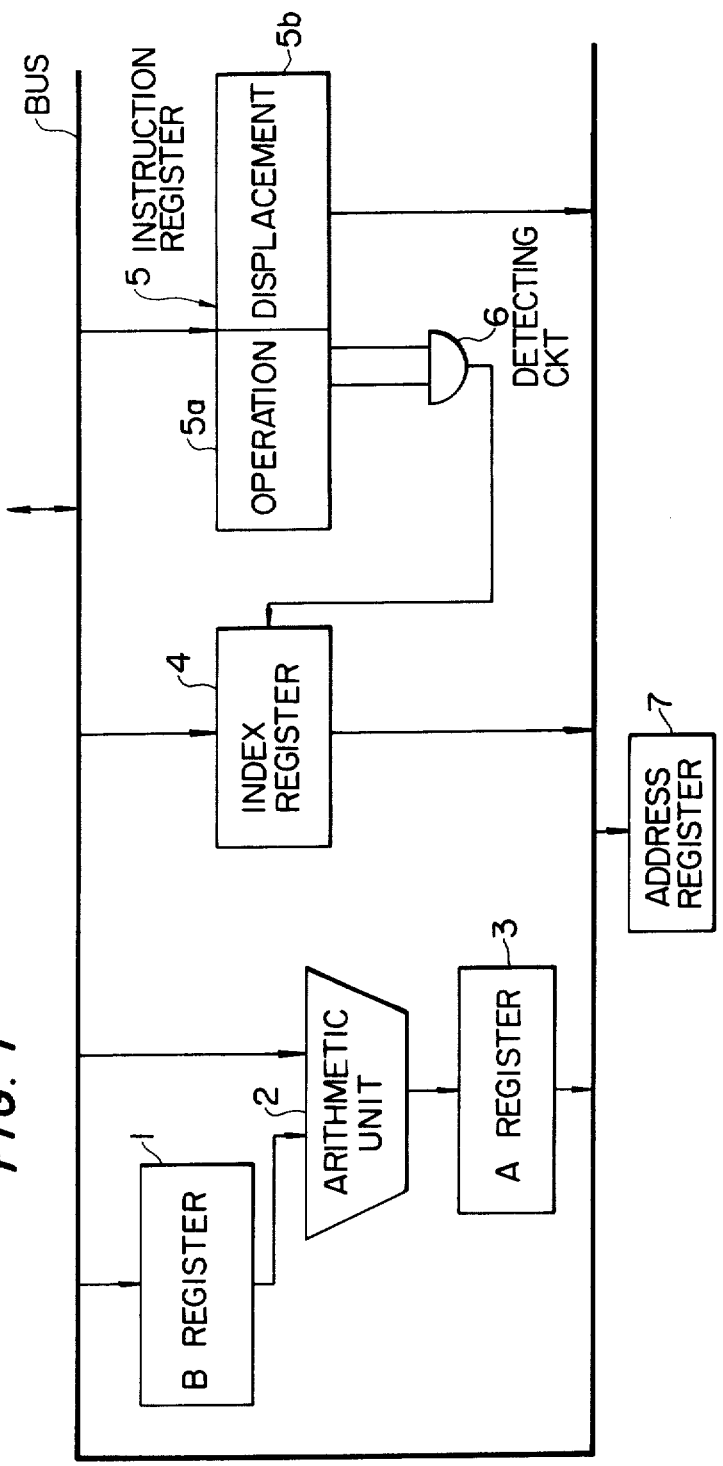

With reference to FIG. 1, in an address system (an indirect address system) which comprises a B register 1, an adder (arithmetic unit) 2, an A register 3, an index register 4, an instruction register 5, a detecting circuit 6 and an address register 7, and in which the contents of the index register 4 are stored in the B register 1 through a data bus BUS, the contents of the B register 1 are transmitted to one input of the adder 2, the contents of an address part (displacement) 5b of the instruction register 5 are transmitted to the other input of the adder 2 through the data bus BUS, an added output of both the contents is stored in the A register 3, and the contents of this A register are transmitted to the address register 7 whereby a specific address is designated; the detecting circuit 6 detects a signal of a portion of an operation part 5a of the instruction register 5, and when the detection output becomes a certain specified state, the contents of the A register 3 are stored in the index register 4 through the data bus BUS.

When the detection output is a different state, the contents of the index register 4 are not changed.

Figure 2:
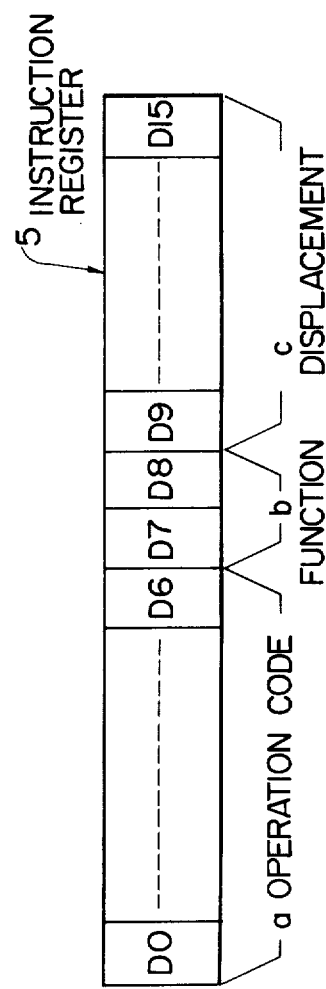
FIG. 2 is an explanatory diagram showing an example of the bit construction of an instruction register.

As illustrated by way of example in FIG. 2, the instruction register 5 forms an operation code at $a$ of bits D0–D6, it forms a function, which determines the state to be transmitted to the detecting circuit 6, at $b$ of bits D7 and D8, and it forms address information, which indicates a displacement, at $c$ of bits D9–D15.

Thus, when the contents of D7 and D8 are 1 and 1, the contents of the index register 4 and the contents of the displacement 5b of the instruction register 5 are added, the result is stored in the A register 3, it is transmitted to the address register 7 to designate an address, whereupon the contents of the A register 3 are shifted to the index register 4.

Subsequently, when new address information is similarly entered into the instruction register 5 again, an address indicated in the displacement of the instruction register 5 is designated with reference to the afore-cited designated address.

Owing to the manner stated above, the addressing system is useful in case where data regularly scattered are to be sequentially processed, for example, in cases where individuals' information (names, birth dates, families, residences, incomes,.....) are recorded for every individual and where the information of each item are to be processed. More specifically, by making D7 and D8 of the program code 1 and 1 and making the displacement part $n$, the data scattered every nth address can be accessed over the whole memory region.

In case of the processing of data irregularly stored, the conventional direct address system, relative address system, indirect address system, etc. can also be utilized by making D7 and D8 of the program code 0 and 0, 0 and 1, 1 and 0, etc.

This invention is not restricted to the foregoing embodiment, but it can adopt various aspects of performance.

For example, the program code may be constructed in any form, and the circuits may be in any concrete forms. The adder may be an exclusive adder which is used only for designating an address.

It will be obvious that the invention can be similarly utilized for computers of the 2-bus or 3-bus system, the 2-address system, etc. besides those of the 1-bus system.

This invention can be extensively applied to the general information processors such as computers.

What is claimed is:

1. An addressing system for an information processor comprising:
    a data bus by way of which data is transmitted within the system;
    an index register having an input and an output coupled to said data bus;
    an address register having an input coupled to said data bus;
    an instruction register, including an operation part and an address part and havng an input coupled to said data bus, said address part having an output coupled to said data bus;

an adder, having a first input coupled to receive the contents of said index register and a second input coupled to receive the contents of the address part of said instruction register, for adding said respective contents to each other to provide a summation output;

detection means, responsive to the state of selected bits of the operation part of said instruction register, for causing the summation output of said adder to be supplied to said index register and stored in said address register upon the state of said selected bits being a preselected state, and for otherwise preventing the summation output of said adder from being supplied to said index register.

2. An addressing system according to claim 1, further including a first further register having an input coupled to said data bus and an output coupled to the first input of said adder, for storing the contents of said index register to be added in said adder.

3. An addressing system according to claim 2, further including a second further register, having an input coupled to the summation output of said adder, and an output coupled to said data bus, for storing the result of the addition carried out by said adder.

4. An addressing system according to claim 3, wherein said detection means comprises a gate circuit having inputs coupled to the operation part of said instruction register at positions corresponding to those of said selected bits, and an output connected to said index register.

* * * * *